United States Patent
Wheeler

(10) Patent No.: US 12,228,176 B2
(45) Date of Patent: Feb. 18, 2025

(54) DISCONNECT MECHANISMS, TRANSMISSION SYSTEMS INCORPORATING THE SAME, AND METHODS ASSOCIATED THEREWITH

(71) Applicant: ALLISON TRANSMISSION, INC., Indianapolis, IN (US)

(72) Inventor: Nicholas Wheeler, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/450,734

(22) Filed: Aug. 16, 2023

(65) Prior Publication Data

US 2023/0392651 A1 Dec. 7, 2023

Related U.S. Application Data

(63) Continuation of application No. 17/517,775, filed on Nov. 3, 2021, now Pat. No. 11,846,325.

(51) Int. Cl.
*F16D 11/10* (2006.01)
*F16D 11/00* (2006.01)
*F16D 23/12* (2006.01)

(52) U.S. Cl.
CPC ........ *F16D 11/10* (2013.01); *F16D 2011/006* (2013.01); *F16D 2023/123* (2013.01); *F16D 2023/126* (2013.01); *F16D 2250/0084* (2013.01)

(58) Field of Classification Search
CPC ............... F16D 11/10; F16D 2011/006; F16D 2023/123; F16D 2023/126; F16D 2125/28; F16D 2125/64; F16D 2500/31466; F16H 3/30; F16H 59/04; F16H 25/12

See application file for complete search history.

(56) References Cited

U.S. PATENT DOCUMENTS

| | | | |
|---|---|---|---|
| 3,039,317 A * | 6/1962 | Wilson | F16H 1/02 74/504 |
| 3,504,563 A | 4/1970 | Polak | |
| 3,675,498 A * | 7/1972 | Cuda | F16H 21/20 74/570.21 |
| 3,760,920 A | 9/1973 | Delfeld | |
| 4,042,088 A | 8/1977 | Schmohe | |
| 4,244,455 A | 1/1981 | Loker | |
| 4,349,092 A | 9/1982 | Geisthoff | |
| 4,479,568 A | 10/1984 | Palazzolo et al. | |
| 4,684,000 A | 8/1987 | Brown | |
| 4,915,200 A | 4/1990 | Jacques et al. | |

(Continued)

FOREIGN PATENT DOCUMENTS

| | | |
|---|---|---|
| DE | 102011080672 A1 | 12/2012 |
| EP | 3403906 B1 | 9/2020 |
| FR | 2552251 A1 | 11/1985 |

*Primary Examiner* — Bobby Rushing, Jr.
(74) *Attorney, Agent, or Firm* — Taft Stettinius & Hollister LLP; Stephen F. Rost

(57) ABSTRACT

Transmission systems, disconnect mechanisms, and methods of assembling disconnect mechanisms are envisioned. A disconnect mechanism is adapted to selectively decouple a driving device from a driven device. The disconnect mechanism includes a lever, an inner shaft, an outer shaft, and a housing. The inner shaft is coupled to the lever, the outer shaft is coupled to the inner shaft, and the housing at least partially houses the inner shaft and the outer shaft.

19 Claims, 7 Drawing Sheets

(56) References Cited

U.S. PATENT DOCUMENTS

| | | | |
|---|---|---|---|
| 4,993,533 A | 2/1991 | Brown | |
| 5,040,654 A | 8/1991 | Trommer | |
| 6,247,867 B1 | 6/2001 | Speer | |
| 6,935,479 B2 | 8/2005 | Cummins et al. | |
| 7,182,193 B2 | 2/2007 | Howard | |
| 8,074,777 B2 | 12/2011 | Birdi et al. | |
| 9,186,540 B2 * | 11/2015 | Bass | A63B 22/0605 |
| 9,690,253 B2 | 6/2017 | Tamura | |
| 9,726,227 B2 | 8/2017 | Combs et al. | |
| 9,880,508 B2 | 1/2018 | Tomita et al. | |
| 2013/0322924 A1 | 12/2013 | Kondo et al. | |
| 2021/0310549 A1 | 10/2021 | Mizuno | |

\* cited by examiner

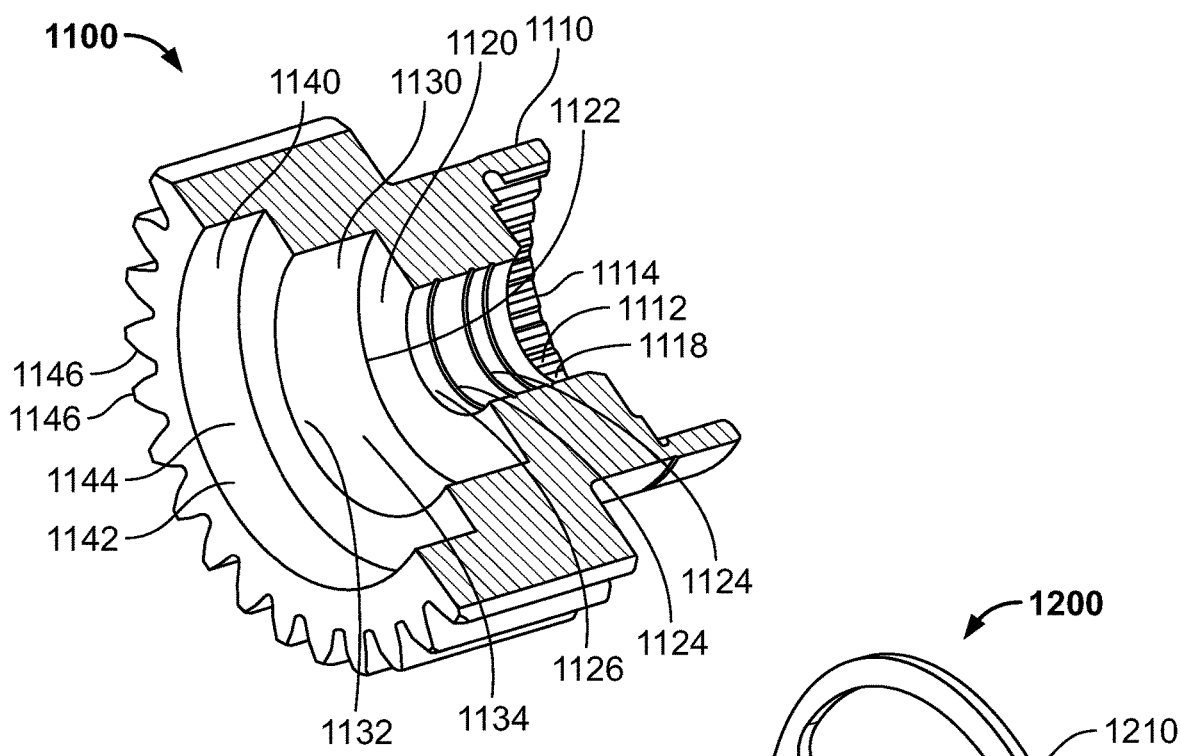
FIG. 11
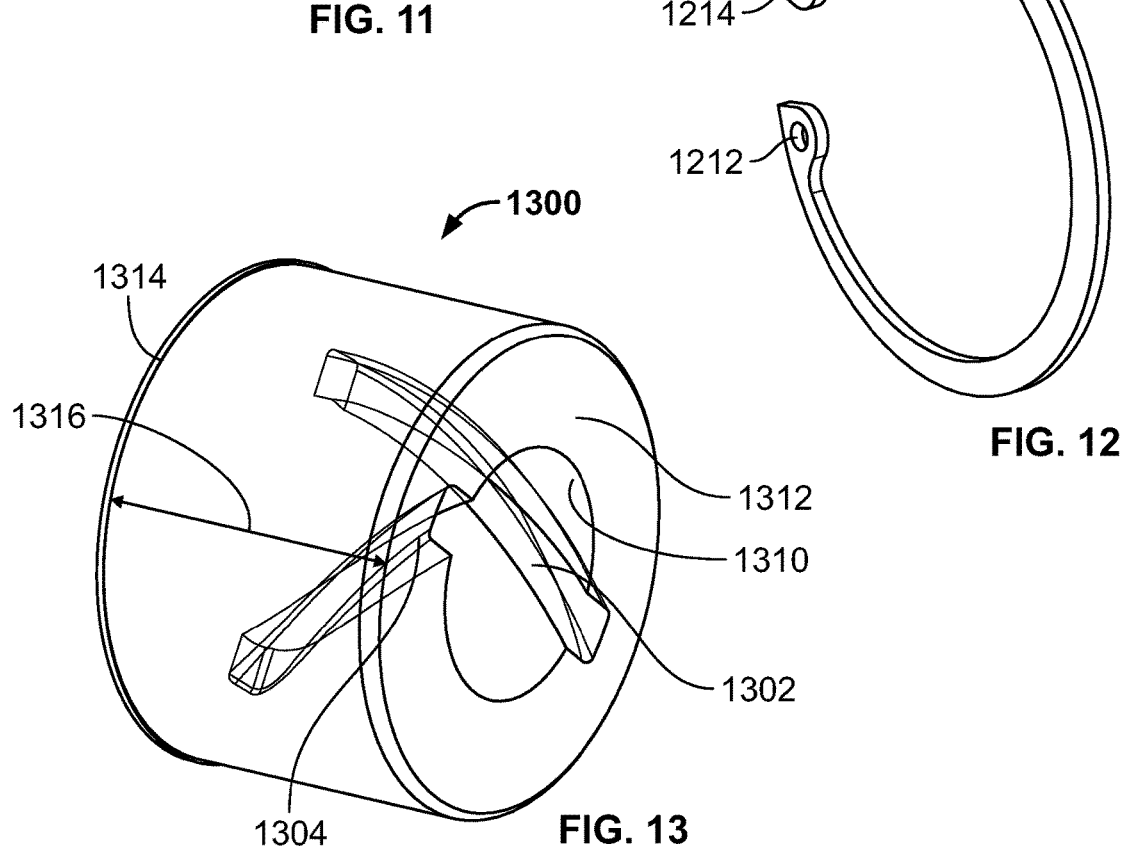
FIG. 12
FIG. 13

DISCONNECT MECHANISMS, TRANSMISSION SYSTEMS INCORPORATING THE SAME, AND METHODS ASSOCIATED THEREWITH

CROSS-REFERENCE TO RELATED APPLICATION(S)

This application is a continuation of, and claims the priority benefit of, U.S. patent application Ser. No. 17/517,775, which was filed on Nov. 3, 2021. The contents of that application are incorporated herein by reference in their entirety.

FIELD OF THE DISCLOSURE

The present disclosure relates, generally, to transmission systems, and, more specifically, to transmission systems incorporating one or more disconnect mechanisms.

BACKGROUND

Interruption of power transmission along one or more torque paths may be required during operation of some vehicles. To that end, some vehicles may incorporate transmission systems having one or more disconnect mechanisms. In some cases, manually operated disconnect mechanisms may demand an undesirable degree of operator effort. Additionally, in some cases, it may be difficult to determine the operative state of manually operated disconnect mechanisms. Systems and/or devices that incorporate disconnect mechanisms and avoid the aforementioned shortcomings, among other drawbacks, remain an area of interest.

SUMMARY

The present disclosure may comprise one or more of the following features and combinations thereof.

According to one aspect of the present disclosure, a disconnect mechanism for selectively decoupling a driving device from a driven device may include a lever, an inner shaft, an outer shaft, and a housing. The inner shaft may be coupled to the lever for rotation about a longitudinal axis in response to manual manipulation of the lever. The outer shaft may be coupled to the inner shaft for common rotation therewith about the longitudinal axis, and the outer shaft may include a plurality of protrusions each extending outwardly from an exterior surface of the outer shaft. The housing may at least partially house the inner shaft and the outer shaft, and the housing may include a plurality of helical slots each receiving a corresponding one of the plurality of protrusions. In use of the disconnect mechanism, manual manipulation of the lever may drive rotation of the outer shaft about the longitudinal axis to cause movement of the plurality of protrusions in the plurality of helical slots. Movement of the plurality of protrusions in the plurality of helical slots may guide translation of the outer shaft along the longitudinal axis to transition the disconnect mechanism between an engaged state, in which the disconnect mechanism couples the driving device to the driven device, and a disengaged state, in which the disconnect system decouples the driving device from the driven device.

In some embodiments, the transition of the disconnect mechanism between the engaged state and the disengaged state may correspond to less than 90 degrees of manual rotation of the lever about the longitudinal axis. The transition of the disconnect mechanism between the engaged state and the disengaged state may correspond to 60 degrees of manual rotation of the lever about the longitudinal axis.

In some embodiments, the inner shaft may include a splined rod that defines one end of the inner shaft, a keyed cylinder that defines another end of the inner shaft opposite the one end, and a collar positioned between the splined rod and the keyed cylinder. The collar may have a diameter greater than a diameter of the splined rod and a diameter of the keyed cylinder, the keyed cylinder may extend circumferentially all the way around the longitudinal axis, and the keyed cylinder may include a plurality of key projections circumferentially spaced 180 degrees from one another about the longitudinal axis. The outer shaft may include a body that defines a first end of the outer shaft and has a first diameter and a neck that defines a second end of the outer shaft opposite the first end and has a second diameter less than the first diameter, the plurality of protrusions may extend outwardly from the body at an outer diameter thereof and be circumferentially spaced 180 degrees from one another about the longitudinal axis, and the body may include a plurality of key grooves at an inner diameter thereof that receive the plurality of key projections.

In some embodiments, the disconnect mechanism may include a biasing element arranged between the inner shaft and the outer shaft such that the biasing element extends along the longitudinal axis, the biasing element may apply a biasing force to the outer shaft and the lever may apply a lever force to the inner shaft, and in the engaged state of the disconnect mechanism, the biasing force applied to the outer shaft by the biasing element and the lever force applied to the inner shaft by the lever may cooperate to resist translation of the outer shaft along the longitudinal axis. In the disengaged state of the disconnect mechanism, the biasing force applied to the outer shaft by the biasing element and the lever force applied to the inner shaft by the lever may be insufficient to resist translation of the outer shaft along the longitudinal axis. Additionally, in some embodiments, the disconnect mechanism may include a bearing that surrounds the outer shaft at an inner diameter of the bearing, a locknut that surrounds the outer shaft and constrains the bearing against translation along the longitudinal axis relative to the outer shaft, a coupling shaft coupled to the bearing at an outer diameter of the bearing, and a plurality of snap rings that secure the coupling shaft to the bearing at the outer diameter of the bearing. Movement of the plurality of protrusions in the plurality of helical slots may cause translation of the bearing, the locknut, the coupling shaft, and the plurality of snap rings along the longitudinal axis with the outer shaft.

According to another aspect of the present disclosure, a transmission system may include a driving device, a driven device, and a disconnect mechanism. The driving device may include a transmission to transmit rotational power. The driven device may include a final drive hub to receive rotational power from the driving device. The disconnect mechanism may selectively decouple the driving device from the driven device. The disconnect mechanism may include a lever, an inner shaft, an outer shaft, and a housing. The inner shaft may be coupled to the lever for rotation about a longitudinal axis in response to manual manipulation of the lever. The outer shaft may be coupled to the inner shaft for common rotation therewith about the longitudinal axis, and the outer shaft may include a plurality of protrusions. The housing may at least partially house the inner shaft and the outer shaft, and the housing may include a plurality of helical slots each receiving a corresponding one of the plurality of protrusions. In use of the transmission system, manual manipulation of the lever may drive movement of the plurality of protrusions in the plurality of helical slots to guide translation of the outer shaft along the longitudinal axis such that the disconnect mechanism transitions between an engaged state, in which the disconnect mechanism couples the driving device to the driven device, and a disengaged state, in which the disconnect system decouples the driving device from the driven device.

In some embodiments, the transition of the disconnect mechanism between the engaged state and the disengaged state may correspond to 60 degrees of manual rotation of the lever about the longitudinal axis. Additionally, in some embodiments, the inner shaft may include a splined rod that defines one end of the inner shaft, a keyed cylinder that defines another end of the inner shaft opposite the one end, and a collar positioned between the splined rod and the keyed cylinder, the collar may have a diameter greater than a diameter of the splined rod and a diameter of the keyed cylinder, the keyed cylinder may extend circumferentially all the way around the longitudinal axis, and the keyed cylinder may include a plurality of key projections circumferentially spaced 180 degrees from one another about the longitudinal axis. The outer shaft may include a body that defines a first end of the outer shaft and has a first diameter and a neck that defines a second end of the outer shaft opposite the first end and has a second diameter less than the first diameter, the plurality of protrusions may extend outwardly from the body at an outer diameter thereof and be circumferentially spaced 180 degrees from one another about the longitudinal axis, and the body may include a plurality of key grooves at an inner diameter thereof that receive the plurality of key projections.

In some embodiments, the disconnect system may further include a biasing element arranged between the inner shaft and the outer shaft such that the biasing element extends along the longitudinal axis, a bearing that surrounds the outer shaft at an inner diameter of the bearing, a locknut that surrounds the outer shaft and constrains the bearing against translation along the longitudinal axis relative to the outer shaft, a coupling shaft coupled to the bearing at an outer diameter of the bearing, and a plurality of snap rings that secure the coupling shaft to the bearing at the outer diameter of the bearing. Movement of the plurality of protrusions in the plurality of helical slots may cause translation of the bearing, the locknut, the coupling shaft, and the plurality of snap rings along the longitudinal axis with the outer shaft.

According to yet another aspect of the present disclosure, a method of assembling a disconnect mechanism to permit selective decoupling of a driving device from a driven device using the disconnect mechanism may include (i) inserting a biasing element into a first passageway formed in an outer shaft of the disconnect mechanism, (ii) advancing an inner shaft of the disconnect mechanism into the first passageway such that the biasing element is at least partially received in a second passageway formed in the inner shaft, (iii) coupling the outer shaft to a coupling shaft of the disconnect mechanism, (iv) installing the inner shaft, the outer shaft, and the biasing element in a housing of the disconnect mechanism such that a plurality of protrusions of the outer shaft are received by a plurality of helical slots formed in the housing and the inner shaft, the outer shaft, and the biasing element are aligned along a longitudinal axis, and (v) attaching a lever of the disconnect mechanism to the inner shaft.

In some embodiments, attaching the lever of the disconnect mechanism to the inner shaft may include establishing a mechanical linkage between the lever and the outer shaft such that manual rotation of the lever drives translation of the outer shaft and the coupling shaft along the longitudinal axis in use of the disconnect mechanism. Additionally, in some embodiments, coupling the outer shaft to the coupling shaft may include arranging the outer shaft in contact with a bearing at an inner diameter of the bearing, securing a locknut to the outer shaft to constrain the bearing against translation along the longitudinal axis relative to the outer shaft, contacting the bearing with the coupling shaft at an outer diameter of the bearing, and affixing the outer diameter of the bearing to the coupling shaft using a plurality of snap rings. Attaching the lever of the disconnect mechanism to the inner shaft may include establishing a mechanical linkage between the lever and the outer shaft such that manual rotation of the lever drives translation of the outer shaft, the bearing, the locknut, the plurality of snap rings, and the coupling shaft along the longitudinal axis in use of the disconnect mechanism.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 11 is a sectional view of a coupling shaft included in the disconnect mechanism of FIG. 3;

FIG. 12 is a perspective view of at least one snap ring included in the disconnect mechanism of FIG. 3; and FIG. 13 is a perspective view of a housing included in the disconnect mechanism of FIG. 3.

DETAILED DESCRIPTION

Figure 1:
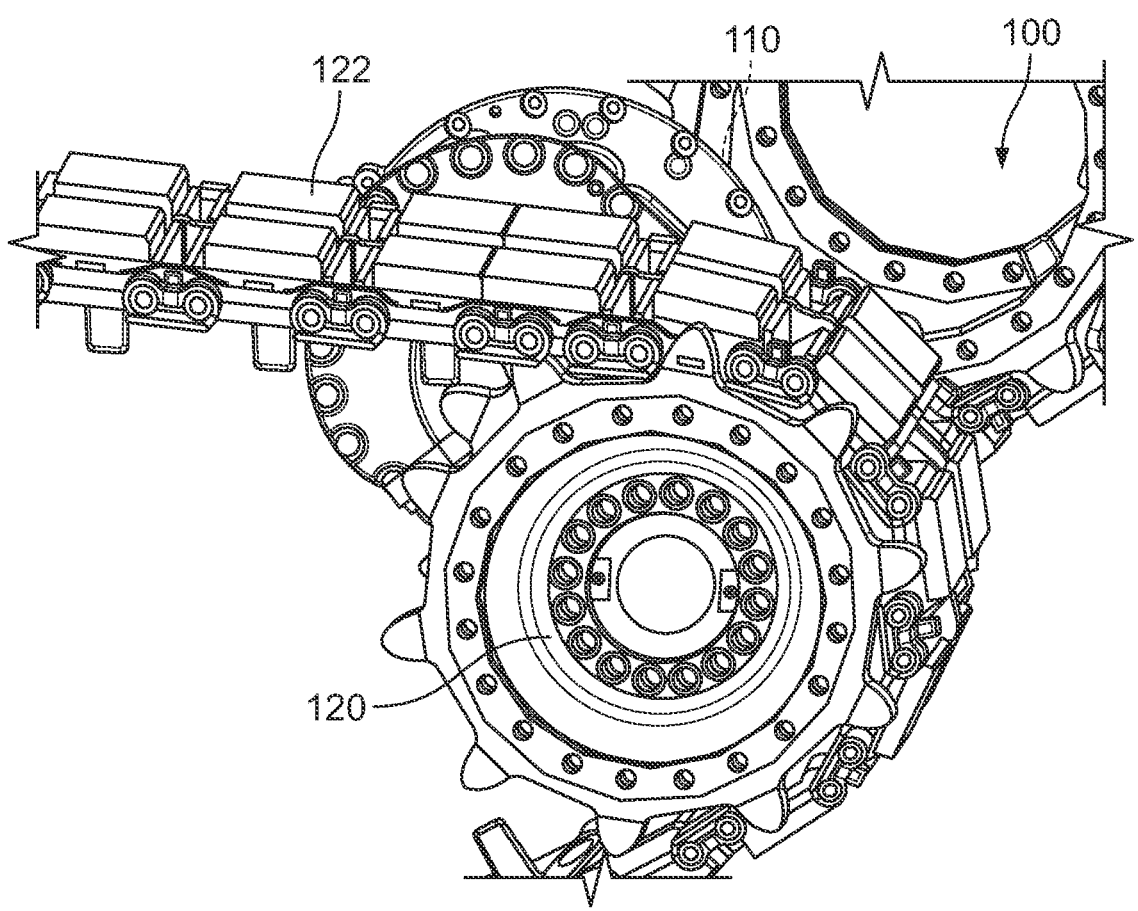
FIG. 1 is a perspective view of a transmission system adapted for use with a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

The present disclosure envisions a disconnect mechanism (e.g., the disconnect mechanism 130) for selectively decoupling a driving device (e.g., the device 110) from a driven device (e.g., the device 120). Among other elements, the disconnect mechanism may include a lever (e.g., the lever 500), an inner shaft (e.g., the inner shaft 600), an outer shaft (e.g., the outer shaft 700), and a housing (e.g., the housing 1300). The inner shaft is coupled to the lever for rotation about a longitudinal axis (e.g., the axis LA) in response to manual manipulation of the lever. The outer shaft is coupled to the inner shaft for common rotation therewith about the longitudinal axis, and the outer shaft includes protrusions (e.g., the protrusions 702, 704) each extending outwardly away from an exterior surface (e.g., the surface 706) of the outer shaft. The housing at least partially houses the inner shaft and the outer shaft and includes helical slots (e.g., helical slots 1302, 1304) each receiving a corresponding one of the protrusions. In use of the disconnect mechanism, manual manipulation of the lever drives rotation of the outer shaft about the longitudinal axis to cause movement of the protrusions in the helical slots. Movement of the protrusions in the helical slots guides translation of the outer shaft along the longitudinal axis to transition the disconnect mechanism between an engaged state (e.g., the state 300), in which the disconnect mechanism couples the driving device to the driven device, and a disengaged state (e.g., the state 400), in which the disconnect system decouples the driving device from the driven device.

It should be appreciated that in some applications, drive system torque pathways may be disconnected or interrupted. In conventional configurations, that disconnection or interruption may correspond to, or otherwise be associated with, axial movement of mating splines. In such configurations, the axial movement of mating splines may be driven by rotation of a hand or tool-operated lever. The conversion of rotational motion of the lever to axial motion of the splines is typically achieved by one or more screw mechanisms. Operation of the screw mechanism(s) often requires the lever to be turned multiple times. Additionally, the axial position of the splines may be difficult to determine in correspondence to the rotational position of the lever.

The disconnect mechanism envisioned by the present disclosure accomplishes the conversion of rotational motion to axial motion achieved with conventional screw mechanisms while providing a number of advantages. In one respect, the degree of rotational motion required to operate the envisioned disconnect mechanism between the engaged and disengaged states discussed below is less than the rotational motion necessitated by conventional configurations. As such, operation of the disconnect mechanism contemplated herein requires less time and less effort than the time and effort needed to operate other mechanisms. In another respect, the axial position of one or more components of the disconnect mechanism provided herein may be readily observed and determined in correspondence to the rotational position of the lever of the disconnect mechanism. Consequently, the operational state of the disconnect mechanism provided herein may be more easily determined than the operational state of other mechanisms.

Referring now to FIG. 1, an illustrative transmission system 100 is adapted to transmit rotational power to a load in use thereof. In some embodiments, the transmission system 100 is configured to transmit rotational power generated by a power source, such as one or more drive units, motors, engines, power plants, or the like, for example, to the load. Additionally, in some embodiments, the transmission system 100 may incorporate one or more drive units, motors, engines, power plants, or the like.

In some embodiments, the illustrative transmission system 100 may be adapted for use with, or otherwise incorporated into, one or more vehicles employed in a variety of applications. In some embodiments, the transmission system 100 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the transmission system 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

The transmission system 100 illustratively includes a driving device 110 (shown in phantom), a driven device 120, and a disconnect mechanism 130. In some embodiments, the driving device 110 includes, or is otherwise embodied as, a transmission configured to transmit rotational power supplied by a rotational power source as described above to the driving device 120. In some embodiments, the driven device 120 includes, or is otherwise embodied as, a final drive hub or final drive hub assembly which is coupled to a load. In the illustrative example, the driven device 120 is coupled to a track 122 of a vehicle such that rotational power may be transmitted from the driving device 110 to the track 122 in use of the vehicle to drive movement thereof. However, in other examples, the driven device 120 may be coupled to another suitable structure operable to receive rotational power from the driving device 110, such as a wheel, a power take-off gear, or a power take-off assembly, just to name a few. Furthermore, in some examples, the driven device 120 may be embodied as, or otherwise include, a power take-off gear or a power take-off assembly. The disconnect mechanism 130 is configured to selectively couple the devices 110, 120 to transmit rotational power from the driving device 110 to the driven device 120 in use of the transmission system 100. Additionally, as explained in more detail below, the disconnect mechanism 130 is configured to selectively decouple the driving device 110 from the driven device 120 in use of the transmission system 100 to interrupt rotational power transmission between the devices 110, 120.

Figure 2:
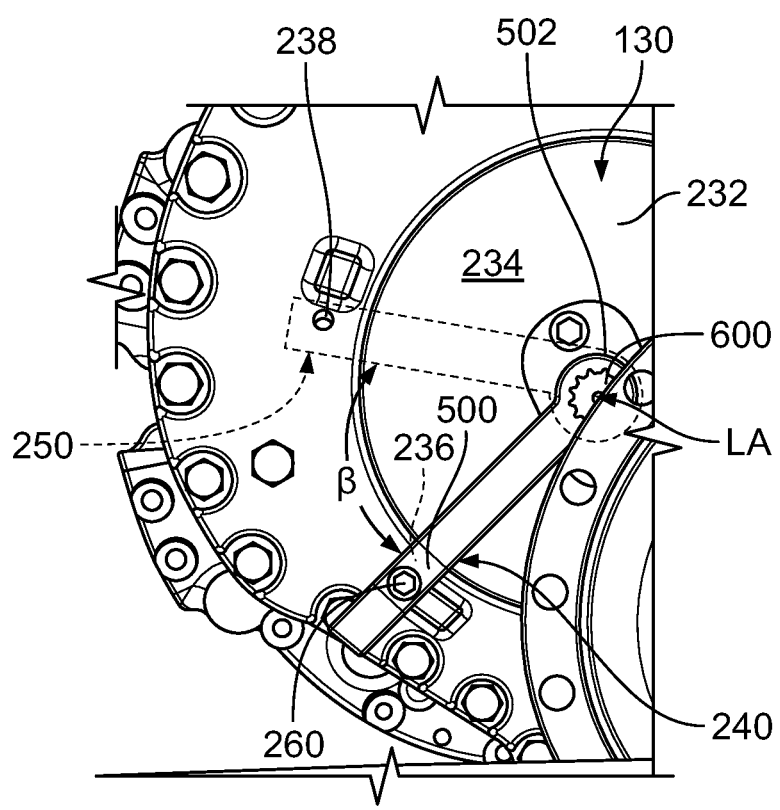
FIG. 2 is a detail view of FIG. 1 with some elements omitted for the sake of simplicity.
Figure 4:
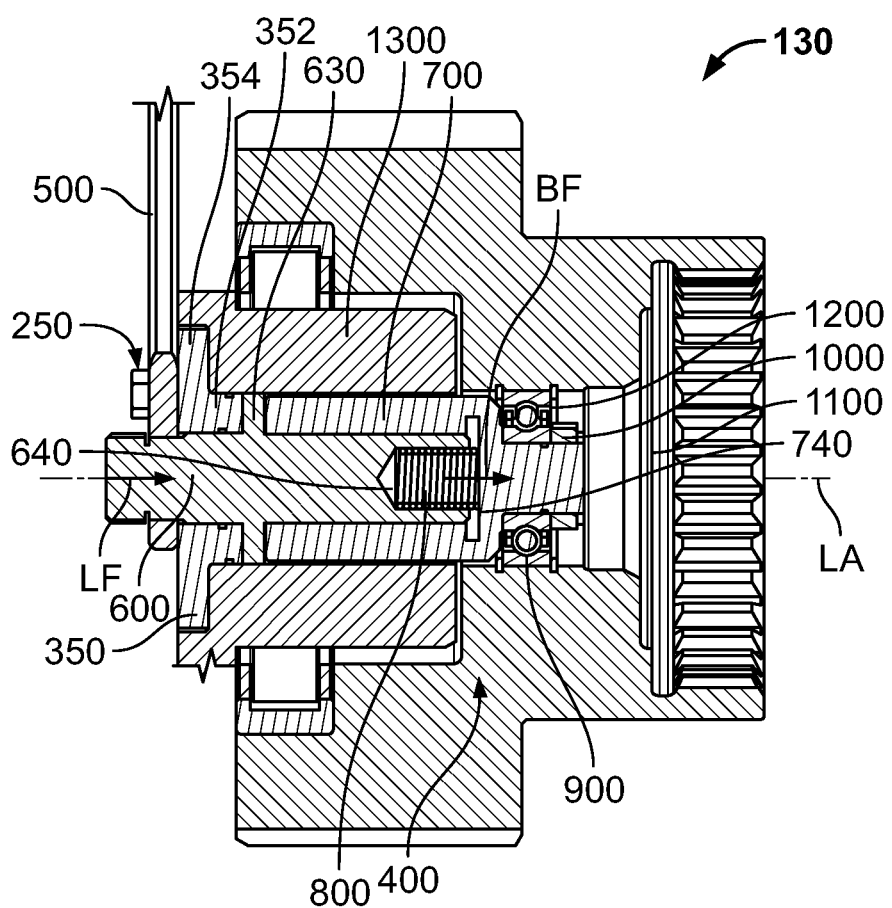
FIG. 4 is a sectional view of the disconnect mechanism of FIG. 3 which is depicted in a disengaged state.
Figure 5:
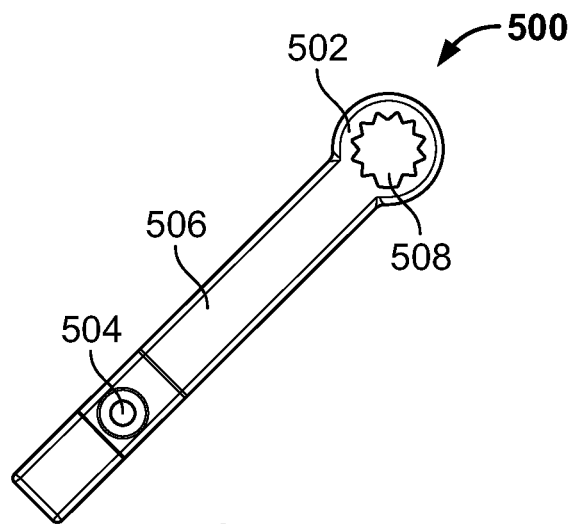
FIG. 5 is a perspective view of a lever included in the disconnect mechanism of FIG. 3.

Referring now to FIG. 2, in the illustrative embodiment, the disconnect mechanism 130 includes a lever 500 (see also FIG. 5). The lever 500 is configured for attachment to an inner shaft 600 (see FIG. 6) extending outwardly away from an exterior surface 234 of a case 232 of the disconnect mechanism 130. When a head 502 of the lever 500 is positioned around the inner shaft 600 as shown in FIG. 2, the lever 500 is configured for pivotal movement about a longitudinal axis LA. More specifically, the lever 500 is manually pivotal about the longitudinal axis LA between a first position 240 corresponding to an engaged state 300 (see FIG. 3) of the disconnect mechanism 130 and a second position 250 (shown in phantom) corresponding to a disengaged state 400 (see FIG. 4) of the disconnect mechanism 130.

In the illustrative embodiment, the lever 500 is lockable in each of the positions 240, 250. To that end, the lever 500 is formed to include an opening 504 and the exterior surface 234 of the case 232 is formed to include holes 236, 238. When the lever 500 is in the position 240, the opening 504 may be aligned with the hole 236 to receive a fastener 260 and thereby lock the lever 500 in the position 240. Similarly, when the lever 500 is in the position 250, the opening 504 may be aligned with the hole 238 to receive the fastener 260 and thereby lock the lever 500 in the position 250.

As described in greater detail below, manual manipulation of the lever 500 between the positions 240, 250 transitions the disconnect mechanism 130 between the engaged state 300 and the disengaged state 400. In the engaged state 300 of the disconnect mechanism 130, the disconnect mechanism 130 couples the driving device 110 to the driven device 120. In the disengaged state 400 of the disconnect mechanism 130, the disconnect system 130 decouples the driving device 110 from the driven device 120. Additionally, as further discussed below, transitioning between the engaged state 300 and the disengaged state 400 involves unlocking the lever 500 from the present position (e.g., one of the positions 240, 250) and locking the lever 500 in its desired position (e.g., the other of the positions 240, 250).

In the illustrative embodiment, movement of the lever 500 between the positions 240, 250 corresponds to, or is otherwise associated with, less than 90 degrees of manual rotation about the longitudinal axis LA. In some embodiments, movement of the lever 500 between the positions 240, 250 corresponds to, or is otherwise associated with, 60 degrees of manual rotation about the longitudinal axis LA, which is represented by angle $\beta$. It should be appreciated that since movement of the lever 500 between the positions 240, 250 transitions the disconnect mechanism 130 between the engaged state 300 and the disengaged state 400, that transition corresponds to, and is characterized by, the aforementioned rotation of the lever 500 about the longitudinal axis LA.

Figure 3:
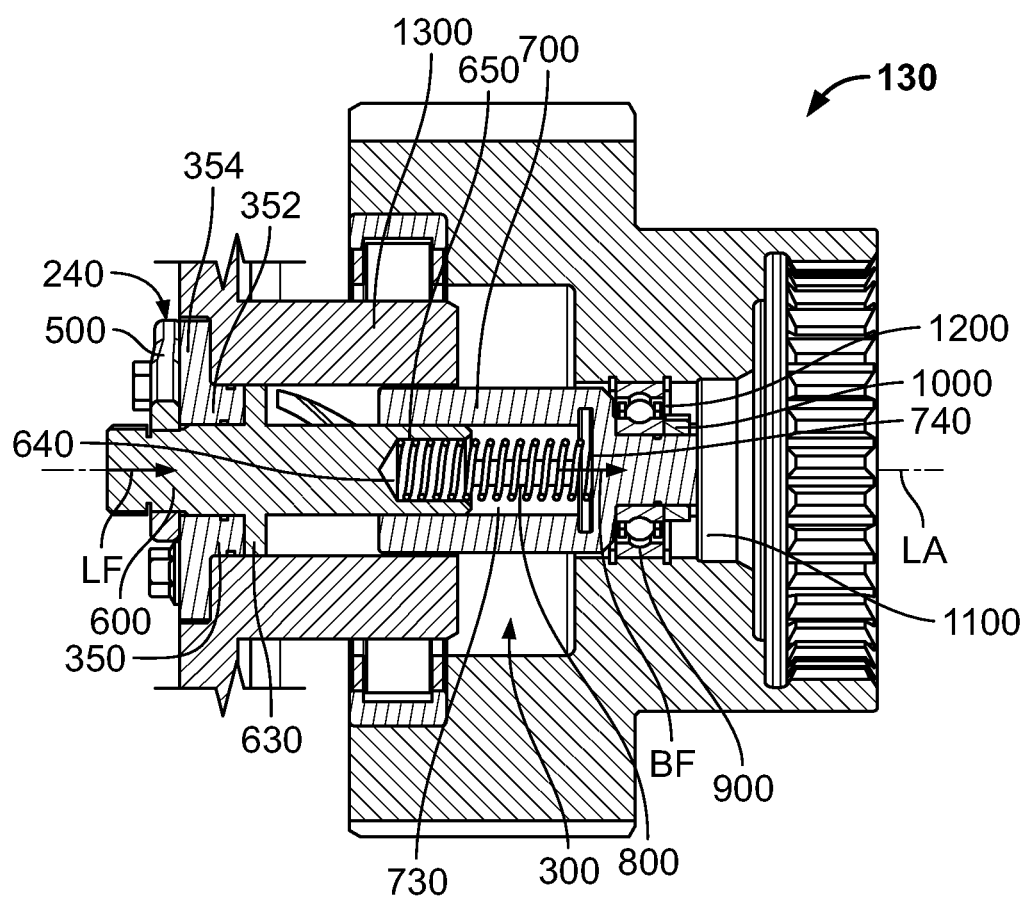
FIG. 3 is a sectional view of a disconnect mechanism included in the transmission system of FIG. 1 which is depicted in an engaged state.

Referring now to FIGS. 3 and 4, among other things, the illustrative disconnect mechanism 130 includes the lever 500, the inner shaft 600, an outer shaft 700 (see FIG. 7), and a housing 1300 (see FIG. 13). The inner shaft 600 is coupled to the lever 500 for rotation therewith about the longitudinal axis LA in response to manual manipulation of the lever 500 as indicated above. The outer shaft 700 is coupled to the inner shaft 600 for rotation therewith about the longitudinal axis LA. The outer shaft 700 includes protrusions 702, 704 extending outwardly away from an exterior surface 706 of a body 708 of the outer shaft 700. The housing 1300 at least partially houses the inner shaft 600 and the outer shaft 700 and includes helical slots 1302, 1304 each sized to receive a corresponding one of the protrusions 702, 704.

As further discussed below, in use of the illustrative disconnect mechanism 130, manual manipulation of the lever 500 drives rotation of the outer shaft 700 about the longitudinal axis LA to cause movement of the protrusions 702, 704 in the helical slots 1302, 1304. Furthermore, as discussed in greater detail below, movement of the protrusions 702, 704 in the helical slots 1302, 1304 guides translation of the outer shaft 700 along the longitudinal axis LA to transition the disconnect mechanism 130 between the engaged state 300 and the disengaged state 400. Of course, it should be appreciated that the transition of the disconnect mechanism 130 between the states 300, 400 which is guided by translation of the outer shaft 700 along the longitudinal axis LA is effected by rotation of the lever 500 between the positions 240, 250 discussed above.

The illustrative disconnect mechanism 130 further includes a biasing element 800 (see FIG. 8), a bearing 900 (see FIG. 9), a locknut 1000 (see FIG. 10), a coupling shaft 1100 (see FIG. 11), and at least one snap ring 1200 (see FIG. 12). The biasing element 800 is arranged between the inner shaft 600 and the outer shaft 700 such that the biasing element 800 extends along the longitudinal axis LA in each of the engaged and disengaged states 300, 400 of the disconnect mechanism 130. The bearing 900 surrounds the outer shaft 700 at an inner diameter ID of the bearing 900 in each of the engaged and disengaged states 300, 400 of the disconnect mechanism 130. The locknut 1000 surrounds the outer shaft 700 and constrains the bearing 900 against translation along the longitudinal axis LA relative to the outer shaft 700 in each of the engaged and disengaged states 300, 400 of the disconnect mechanism 130. The coupling shaft 1100 is coupled to the bearing 900 at an outer diameter OD of the bearing 900 in each of the engaged and disengaged states 300, 400 of the disconnect mechanism 130. The at least one snap ring 1200 includes two snap rings that secure the coupling shaft 1100 to the bearing 900 at the outer diameter OD of the bearing 900 in each of the engaged and disengaged states 300, 400 of the disconnect mechanism 130.

Referring now to FIG. 5, the illustrative lever 500 includes the head 502 and a handle 506 interconnected with the head 502. The handle 506 is sized for manual manipulation by an operator and formed to include the opening 504. The head 502 is formed to include an opening 508 which is sized to receive a portion of the inner shaft 600, as discussed below. In the illustrative embodiment, the head 502 has a circular shape complementary to the shape of the portion of the inner shaft 600, and the handle 506 has a rectangular shape. Of course, it should be appreciated that in other embodiments, the head 502 and the handle 506 may take the shape of other suitable geometric forms. In any case, in the illustrative embodiment, the lever 500 is sized and constructed to apply a lever force LF to the inner shaft 600 when the lever 500 is coupled to the inner shaft 600 (e.g., as shown in FIGS. 3 and 4).

Figure 6:
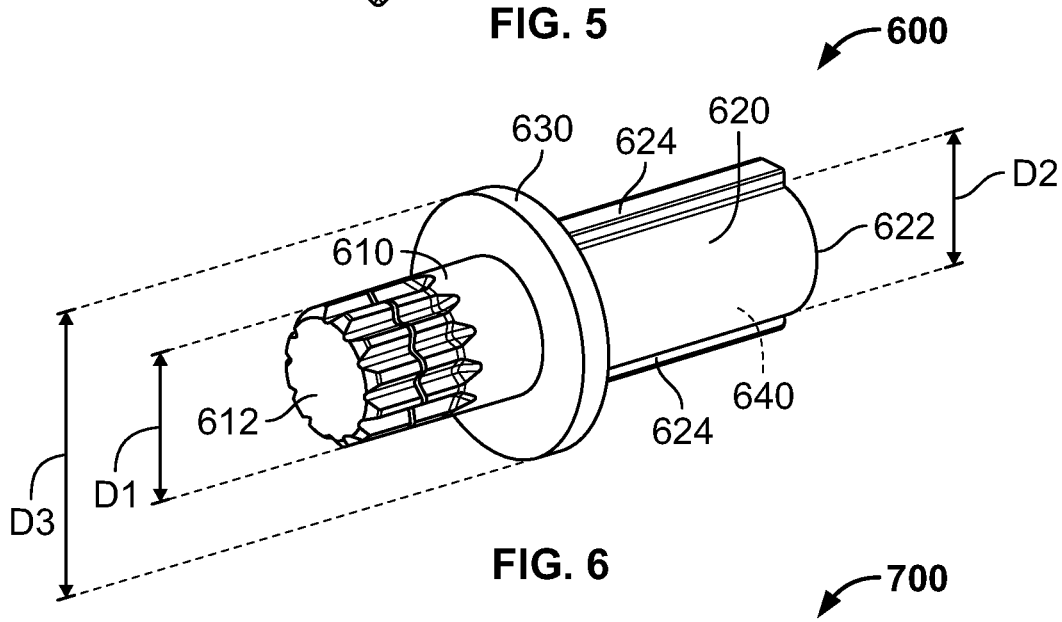
FIG. 6 is a perspective view of an inner shaft included in the disconnect mechanism of FIG. 3.

Referring now to FIG. 6, the illustrative inner shaft 600 includes a splined rod 610, a keyed cylinder 620, and a collar 630 positioned between the splined rod 610 and the keyed cylinder 620. The splined rod 610 defines one end 612 of the inner shaft 600 and the keyed cylinder 620 defines another end 622 of the inner shaft 600 arranged opposite the end 612. The splined rod 610 is sized to be received by the splined opening 508 of the lever 500. The keyed cylinder 620 is sized to be received by the outer shaft 700 in each of the engaged and disengaged states 300, 400 of the disconnect mechanism 130. Each of the splined rod 610, the keyed cylinder 620, and the collar 630 is at least partially positioned in the housing 1300 in each of the engaged and disengaged states 300, 400 of the disconnect mechanism 130.

In the illustrative embodiment, the splined rod 610 of the inner shaft 600 has a cylindrical shape such that the rod 610 extends circumferentially all the way around the longitudinal axis LA in each of the engaged and disengaged states 300, 400 of the disconnect mechanism 130. The splined rod 610 illustratively has a diameter D1. In other embodiments, however, the splined rod 610 may take the shape of other suitable geometric forms.

In the illustrative embodiment, the keyed cylinder 620 of the inner shaft 600 has a generally cylindrical shape such that the cylinder 620 extends circumferentially all the way around the longitudinal axis LA in each of the engaged and disengaged states 300, 400 of the disconnect mechanism 130. The keyed cylinder 620 illustratively has a diameter D2. Additionally, the keyed cylinder 620 is formed to include rectangular key projections 624 that are circumferentially spaced 180 degrees from one another about the longitudinal axis LA in each of the engaged and disengaged states 300, 400 of the disconnect mechanism 130. In other embodiments, however, the keyed cylinder 620 and the key projections 624 may take the shape of other suitable geometric forms.

In the illustrative embodiment, the collar 630 of the inner shaft 600 includes, or is otherwise embodied as, a circular disk that extends circumferentially all the way around the longitudinal axis LA in each of the engaged and disengaged states 300, 400 of the disconnect mechanism 130. The collar 630 illustratively has a diameter D3 that is greater than the diameter D1 of the splined rod 610 and the diameter D2 of the keyed cylinder 620. In other embodiments, however, the collar 630 may take the shape of other suitable geometric forms.

Figure 7:
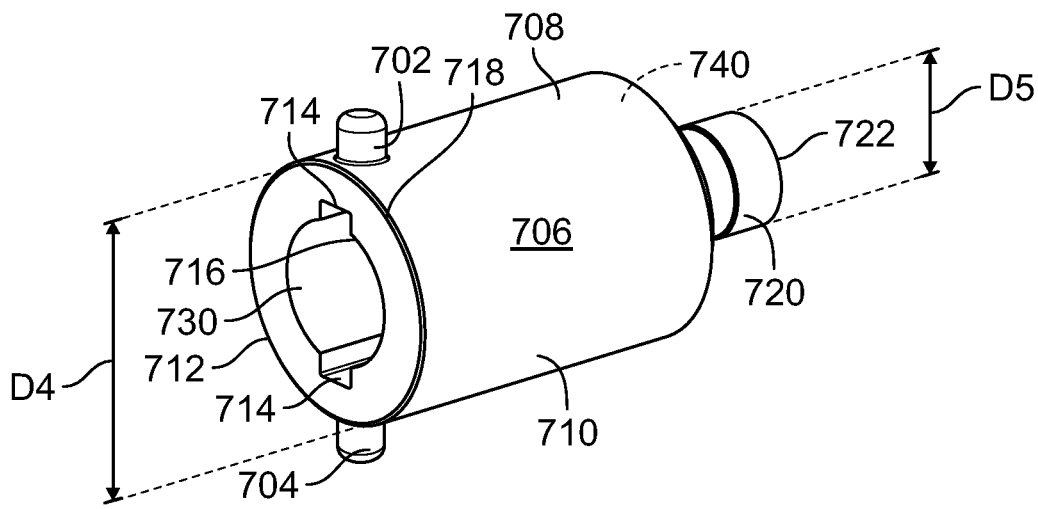
FIG. 7 is a perspective view of an outer shaft included in the disconnect mechanism of FIG. 3.

Referring now to FIG. 7, the illustrative outer shaft 700 includes a body 710 and a neck 720 interconnected with the body 710. The body 710 defines one end 712 of the outer shaft 700 and the neck 720 defines another end 722 of the outer shaft 700 arranged opposite the end 712. The body 710 illustratively has a cylindrical shape and a diameter D4. The neck 720 illustratively has a cylindrical shape and a diameter D5 that is less than the diameter D4 of the body 710. The body 710 is sized and constructed to receive the keyed cylinder 620 of the inner shaft 600 and the biasing element 800 in each of the engaged and disengaged states 300, 400 of the disconnect mechanism 130. The neck 720 is sized and constructed to be received by the bearing 900 and the locknut 1000 in each of the engaged and disengaged states 300, 400 of the disconnect mechanism 130. In other embodiments, however, the body 710 and the neck 720 may take the shape of other suitable geometric forms.

In the illustrative embodiment, the body 710 of the outer shaft 700 is formed to include key grooves 714 at an inner diameter 716 thereof. The key grooves 714 are illustratively sized to receive the key projections 624 of the keyed cylinder 620. As such, similar to the key projections 624, the key grooves 714 are circumferentially spaced 180 degrees from one another about the longitudinal axis LA in each of the engaged and disengaged states 300, 400 of the disconnect mechanism 130.

In the illustrative embodiment, the protrusions 702, 704 extend outwardly from the body 710 at an outer diameter 718 thereof. Each of the protrusions 702, 704 illustratively has a cylindrical shape. In other embodiments, however, it should be appreciated that the protrusions 702, 704 may take the shape of other suitable geometric forms. In any case, the protrusions 702, 704 are circumferentially spaced 180 degrees from one another about the longitudinal axis LA in each of the engaged and disengaged states 300, 400 of the disconnect mechanism 130.

Figure 8:
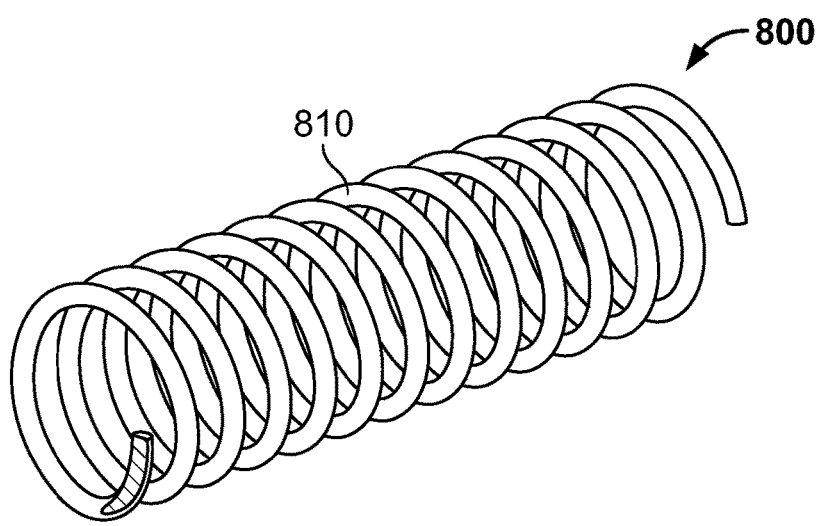
FIG. 8 is a perspective view of a biasing element included in the disconnect mechanism of FIG. 3.

Referring now to FIG. 8, the biasing element 800 illustratively includes, or is otherwise embodied as, any elastic element capable of storing mechanical energy. In the illustrative embodiment, the biasing element 800 includes a spring 810, such as a helical coil spring, a compression spring, an extension spring, a torsion spring, or the like, for example. As best seen in FIG. 3, when the biasing element 800 is arranged between the inner shaft 600 and the outer shaft 700, the biasing element 800 applies a biasing force BF to the outer shaft 700 to urge the outer shaft 700 away from the lever 500 along the longitudinal axis LA.

As suggested by FIG. 3, when the disconnect mechanism 130 is in the engaged state 300, the biasing force BF applied to the outer shaft 700 by the biasing element 800 and the lever force LF applied to the inner shaft 600 by the lever 500 cooperate to resist translation of the outer shaft 700 toward the lever 500 along the longitudinal axis LA. In some embodiments, the combination of (i) the biasing force BF exerted by the biasing element 800 on the outer shaft 700 and (ii) the lever force LF applied by the lever 500 to the inner shaft 600 as a result of the weight of the lever 500 act to cause operation of the disconnect mechanism 130 in the engaged state 300 in the event of a disengagement fault state, such as a fault state associated with incomplete motion of one or more components of the disconnect mechanism 130, improper fastening of the lever 500 in one of the positions 240, 250, or operator error, just to name a few. Conversely, as suggested by FIG. 4, when the disconnect mechanism 130 is in the disengaged state 400, the biasing force BF and the lever force LF are insufficient to resist translation of the outer shaft 700 toward the lever 500 along the longitudinal axis LA. It should be appreciated that the lever 500 and the biasing element 800 are sized and constructed to apply the respective forces LF and BF which have sufficient combined magnitudes to resist translation of the outer shaft 700 toward the lever 500 along the longitudinal axis LA when the disconnect mechanism 130 is in the engaged state 300.

Figure 9:
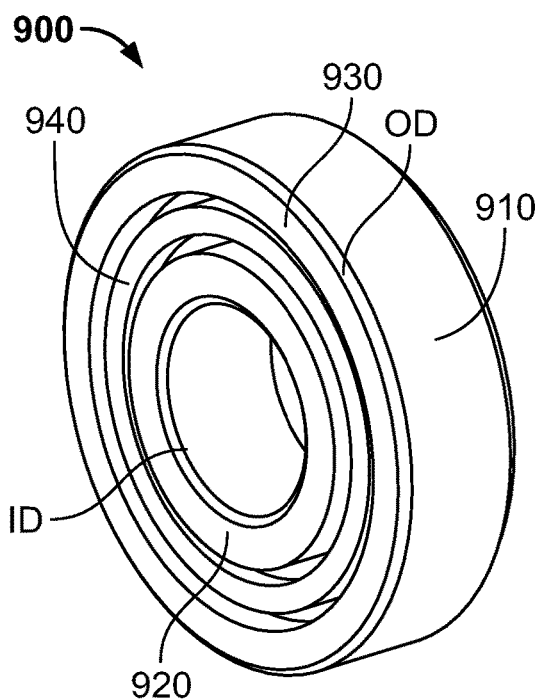
FIG. 9 is a perspective view of a bearing included in the disconnect mechanism of FIG. 3.

Referring now to FIG. 9, the bearing 900 illustratively includes, or is otherwise embodied as, any device capable of at least partially supporting the outer shaft 700 (i.e., the neck 720 thereof) for rotation about the longitudinal axis LA. In some embodiments, the bearing 900 may be configured to at least partially permit or facilitate common rotation of the outer shaft 700 and the coupling shaft 1100 about the longitudinal axis LA. Additionally, in some embodiments, the bearing 900 may be configured to at least partially permit or facilitate some degree of relative rotation between the outer shaft 700 and the coupling shaft 1100 about the longitudinal axis LA.

In the illustrative embodiment, the bearing 900 includes, or is otherwise embodied as, a ball bearing 910, such as an angular contact bearing, an axial ball bearing, a deep-groove ball bearing, a Conrad-style ball bearing, a slot-fill ball bearing, a relieved race ball bearing, a fractured race ball bearing, a hybrid ball bearing, or the like, for example. In other embodiments, however, the bearing 900 may include, or otherwise be embodied as, another suitable bearing.

In some embodiments, the bearing 900 includes an inner race 920, an outer race 930, and an intermediate race 940 arranged radially between the inner race 920 and the outer race 930. The inner race 920 defines the inner diameter ID of the bearing 900 and contacts the neck 720 of the outer shaft 700. The outer race 930 defines the outer diameter OD of the bearing 900 and contacts the coupling shaft 1100. Although not shown, the bearing 900 includes rollers or balls arranged radially between the inner race 920 and the intermediate race 940 and/or the outer race 930 and the intermediate race 940, at least in some embodiments.

Figure 10:
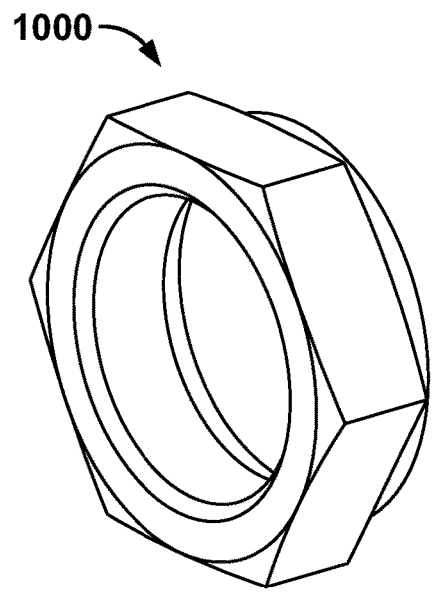
FIG. 10 is a perspective view of a locknut included in the disconnect mechanism of FIG. 3.

Referring now to FIG. 10, the locknut 1000 illustratively includes, or is otherwise embodied as, any device capable of securing the bearing 900 to the outer shaft 700 and thereby constraining the bearing 900 against translation along the longitudinal axis LA relative to the outer shaft 700. In some embodiments, the locknut 1000 may include, or otherwise be embodied as, a self-locking nut, a prevailing torque nut, a stiff nut, an elastic stop nut, or the like. Additionally, in some embodiments, the locknut 1000 may be embodied as any device configured to resist loosening under vibrations and torque to maintain securement of the bearing 900 to the outer shaft 700 during operation of the disconnect mechanism 130.

Referring now to FIG. 11, the coupling shaft 1100 includes, or is otherwise embodied as, any device configured for interaction with the driven device 120 in use of the disconnect mechanism 130. In some embodiments, the coupling shaft 1100 may be integrated into, or otherwise form a portion of, the driven device 120. In any case, in the illustrative embodiment, the coupling shaft 1100 includes a ring 1110, a first annulus 1120, a second annulus 1130, and a third annulus 1140. As best seen in FIGS. 3 and 4, when the disconnect mechanism 130 is in each of the engaged and disengaged states 300, 400, the ring 1110, the first annulus 1120, the second annulus 1130, and the third annulus 1140 are concentrically arranged about the longitudinal axis LA.

The ring 1110 of the coupling shaft 1100 is illustratively configured for interaction with at least a portion of the outer shaft 700 (e.g., the body 710), at least in some embodiments. In other embodiments, however, the ring 1110 may be configured for interaction with another component, such as the bearing 900, for example. The ring 1110 is formed to include teeth 1112 at an inner periphery 1114 thereof. In some embodiments, the teeth 1112 are configured for interaction (i.e., direct contact or indirect coupling) with the outer shaft 700 and/or the bearing 900. The ring 1110 has an outer diameter 1118 measured relative to the longitudinal axis LA.

The first annulus 1120 is illustratively arranged axially (e.g., along the longitudinal axis LA) between the ring 1110 and the second annulus 1130. In the illustrative embodiment, the annulus 1120 has an outer diameter 1122 measured relative to the longitudinal axis LA that is generally equal to the outer diameter 1118 of the ring 1110. The annulus 1120 is formed to include at least one circumferential groove 1124 at an inner periphery 1126 thereof. In some embodiments, the at least one circumferential groove 1124 is sized to at least partially receive the at least one snap ring 1200. In such embodiments, the at least one groove 1124 may include two grooves axially spaced from one another along the longitudinal axis LA and sized to receive two snap rings. Furthermore, in some embodiments, throughout operation of the illustrative disconnect mechanism 130 (e.g., in each of the engaged and disengaged states 300, 400), the at least one snap ring 1200 is received by the at least one circumferential groove 1124 to secure the annulus 1120 in contact with, and/or in engagement with, the outer diameter OD of the bearing 900.

The second annulus 1130 is illustratively arranged axially between the first annulus 1120 and the third annulus 1140. In the illustrative embodiment, the annulus 1130 has an outer diameter 1132 measured relative to the longitudinal axis LA that is greater than the outer diameter 1122 of the annulus 1120 and the outer diameter 1118 of the ring 1110. The annulus 1130 is illustratively devoid of any teeth or grooves at an inner periphery 1134 thereof.

The third annulus 1140 is illustratively arranged axially opposite the ring 1110. In the illustrative embodiment, the annulus 1140 has an outer diameter 1142 measured relative to the longitudinal axis LA that is greater than the outer diameter 1132 of the annulus 1130. The annulus 1140 is illustratively devoid of any teeth or grooves at an inner periphery 1144 thereof. However, in the illustrative embodiment, the annulus 1140 includes teeth 1146 formed at the outer diameter 1142. In some embodiments, the annulus 1140 is configured for interaction (i.e., direct contact or indirect coupling) with a component of the driven device 120.

Referring now to FIG. 12, the at least one snap ring 1200 illustratively includes an arcuate body 1210 extending circumferentially (e.g., about the longitudinal axis LA) between tangs 1212, 1214. The at least one snap ring 1200 illustratively defines a C-shape. Of course, it should be appreciated that the snap ring 1200 may take the shape of other suitable geometric forms. As mentioned above, in some embodiments, the at least one snap ring 1200 is sized for at least partial positioning in the at least one circumferential groove 1124 of the coupling shaft 1100 to secure the coupling shaft 1100 to the bearing 900. In some embodiments, the at least one snap ring 1200 includes two snap rings. In such embodiments, the two snap rings may be axially spaced from one another along the longitudinal axis LA, radially spaced from one another relative to the longitudinal axis LA, or circumferentially spaced from one another about the longitudinal axis LA. However, in other embodiments, it should be appreciated that the at least one snap ring 1200 may include another suitable number of snap rings.

Referring now to FIG. 13, the illustrative housing 1300 is embodied as, or otherwise includes, a structure constrained against translation along the longitudinal axis LA in use of the disconnect mechanism 130. In some embodiments, the housing 1300 may interact with a feature of the driven device 120 (e.g., a mechanical stop) to prevent translation of the housing 1300 along the longitudinal axis LA. Additionally, in some embodiments, the housing 1300 may interact with a feature of the driven device 120 (e.g., a brake) to prevent rotation of the housing 1300 about the longitudinal axis LA. In any case, as indicated above, the housing 1300 illustratively includes the helical slots 1302, 1304.

Each of the illustrative helical slots 1302, 1304 is defined in the housing 1300 at an inner periphery 1310 thereof. In the illustrative arrangement, similar to the protrusions 702, 704 of the outer shaft 700, the helical slots 1302, 1304 of the housing 1300 are circumferentially spaced 180 degrees from one another about the longitudinal axis LA. The slots 1302, 1304 extend axially through an end 1312 of the housing 1300 toward an opposite end 1314 of the housing 1300. Throughout operation of the disconnect mechanism 130 (e.g., in each of the engaged and disengaged states 300, 400), the end 1312 is located farther away from the lever 500 along the longitudinal axis LA than the end 1314. The slots 1302, 1304 extend at least halfway over an axial length 1316 of the housing 1300 measured between the ends 1312, 1314, at least in some embodiments. In some embodiments, the slots 1302, 1304 extend at least three-fourths over the axial length 1316 of the housing 1300.

Returning to FIGS. 3 and 4, a method of assembling the illustrative disconnect mechanism 130 may include inserting the biasing element 800 into a passageway 730 formed in the body 710 of the outer shaft 700. In some embodiments, inserting the biasing element 800 into the passageway 730 may include inserting the element 800 into the passageway 730 such that one end of the biasing element 800 contacts an interior wall 740 of the outer shaft 700. The interior wall 740 at least partially defines the passageway 730, at least in some embodiments.

In some embodiments, the method may include advancing the inner shaft 600 into the passageway 730 such that the biasing element 800 is at least partially received in a passageway 640 formed in the inner shaft 600 as shown in FIGS. 3 and 4. Additionally, in some embodiments, advancing the inner shaft 600 into the passageway 730 may include advancing the inner shaft 600 into the passageway 730 such that the other end of the biasing element 800 contacts inner walls 650 of the inner shaft 600 that at least partially define the passageway 640.

In some embodiments, the method may include coupling the outer shaft 700 to the coupling shaft 1100 as shown in FIGS. 3 and 4. Additionally, in some embodiments, coupling the outer shaft 700 to the coupling shaft 1100 may include the following: (i) arranging the outer shaft 700 in contact with the bearing 900 at the inner diameter ID thereof; (ii) securing the locknut 1000 to the outer shaft 700 to constrain the bearing 900 against axial translation; (iii) contacting the bearing 900 with the coupling shaft 700 at the outer diameter OD of the bearing 900; and (iv) affixing the outer diameter OD of the bearing 900 to the coupling shaft 1100 using the snap rings 1200.

In some embodiments, the method may include installing the inner shaft 600, the outer shaft 700, and the biasing element 800 in the housing 1300 as shown in FIGS. 3 and 4. Additionally, in some embodiments, installing the inner shaft 600, the outer shaft 700, and the biasing element 800 in the housing 1300 may include installing those components in the housing 1300 such that the protrusions 702, 704 are received by the helical slots 1302, 1304 and the inner shaft 600, the outer shaft 700, and the biasing element 800 are aligned along the longitudinal axis LA.

In some embodiments, the method may include retaining axial positions of the inner shaft 600 and the housing 1300 along the longitudinal axis LA using a retaining hub 350 as shown in FIGS. 3 and 4. The retaining hub 350 may include an inner flange 352 and an outer flange 354 interconnected with the inner flange 352 that extends radially outward from the inner flange 352, at least in some embodiments. Additionally, in some embodiments, the retaining hub 350 may include one or more grooves formed along an inner diameter thereof (e.g., an inner diameter defined by the inner flange 352) and one or more grooves formed along an outer diameter thereof (e.g., an outer diameter defined by the outer flange 354), and the groove(s) formed along the inner and outer diameters of the hub 350 may each be sized to receive at least one sealing O-ring. Furthermore, in some embodiments still, retaining axial positions of the inner shaft 600 and the housing 1300 along the longitudinal axis LA may include (i) contacting the collar 630 of the inner shaft 600 with the inner flange 352 of the retaining hub 350 and (ii) contacting the housing 1300 with the outer flange 354 of the retaining hub 350.

In some embodiments, the method may include attaching the lever 500 to the inner shaft 600 as shown in FIGS. 3 and 4. Additionally, in some embodiments, attaching the lever 500 to the inner shaft 600 may include establishing a mechanical linkage between the lever 500 and the outer shaft 700 such that manual rotation of the lever 500 drives translation of the outer shaft 700, the bearing 900, the locknut 1000, the snap rings 1200, and the coupling shaft 1100 along the longitudinal axis LA in use of the disconnect mechanism 130.

Referring still to FIGS. 3 and 4, following assembly of the illustrative disconnect mechanism 130 as described above, the mechanism 130 may be operated in the engaged state 300 to couple the driving device 110 to the driven device 120. As suggested above, to place the disconnect mechanism 130 in the engaged state 300, the lever 500 is arranged in the position 240 and locked in the position 240 using the fastener 260. When the disconnect mechanism 130 is in the engaged state 300, the body 710 of the outer shaft 700 is spaced from the collar 630 of the inner shaft 600 along the longitudinal axis LA.

To place the disconnect mechanism 130 in the disengaged state 400 and thereby decouple the driving device 110 from the driven device 120, the fastener 260 is removed to unlock the lever 500 from the position 240. The lever 500 is then rotated to the position 250 and locked in the position 250 using the fastener 260. When the disconnect mechanism 130 is in the disengaged state 400, the collar 630 of the inner shaft 600 abuts the body 710 of the outer shaft 700 and the bearing 900, the locknut 1000, the coupling shaft 1100, and the snap rings 1200 are disposed to the left (i.e., along the longitudinal axis LA) of the positions of those components in the engaged state 300 of the disconnect mechanism 130. It should be apparent based on the discussion above that movement of the protrusions 702, 704 in the helical slots 1302, 1304 causes translation of the bearing 900, the locknut 1000, the coupling shaft 1100, and the snap rings 1200 along the longitudinal axis LA with the outer shaft 700.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A disconnect mechanism comprising:
a manually manipulatable lever;
an inner shaft coupled to the lever for rotation therewith about a longitudinal axis;
an outer shaft coupled to the inner shaft for rotation therewith about the longitudinal axis; and
a housing that at least partially houses the inner shaft and the outer shaft,
wherein the housing includes a plurality of slots each sized to receive a corresponding one of a plurality of protrusions extending outwardly from an exterior surface of the outer shaft, and
wherein the inner shaft includes a splined rod that defines one end of the inner shaft and a keyed cylinder that defines another end of the inner shaft opposite the one end.

2. The disconnect mechanism of claim 1, wherein the plurality of slots includes no more than two slots.

3. The disconnect mechanism of claim 2, wherein the no more than two slots include two helical slots.

4. The disconnect mechanism of claim 1, wherein in use of the disconnect mechanism, manual manipulation of the lever drives rotation of the outer shaft about the longitudinal axis to cause movement of the plurality of protrusions in the plurality of slots.

5. The disconnect mechanism of claim 4, wherein the plurality of slots includes a plurality of helical slots.

6. The disconnect mechanism of claim 4, wherein movement of the plurality of protrusions in the plurality of slots guides translation of the outer shaft along the longitudinal axis to transition the disconnect mechanism between an engaged state and a disengaged state.

7. The disconnect mechanism of claim 6, wherein:
the disconnect mechanism couples a driving device to a driven device in the engaged state thereof; and
the disconnect mechanism decouples the driving device from the driven device in the disengaged state thereof.

8. The disconnect mechanism of claim 1, wherein the inner shaft includes a collar positioned between the splined rod and the keyed cylinder.

9. The disconnect mechanism of claim 1, wherein the outer shaft includes a body that defines a first end of the outer shaft and has a first diameter and a neck that defines a second end of the outer shaft opposite the first end and has a second diameter less than the first diameter.

10. The disconnect mechanism of claim 9, wherein the plurality of protrusions extend outwardly from the body at an outer diameter thereof and are circumferentially spaced 180 degrees from one another about the longitudinal axis.

11. A transmission system comprising:
a driving device including a transmission to transmit rotational power;
a driven device including a final drive hub to receive rotational power from the driving device; and
a disconnect mechanism to selectively decouple the driving device from the driven device, the disconnect mechanism comprising
a manually manipulatable lever;
an inner shaft coupled to the lever for rotation therewith about a longitudinal axis;
an outer shaft coupled to the inner shaft for rotation therewith about the longitudinal axis; and
a housing that at least partially houses the inner shaft and the outer shaft,
wherein the housing includes a plurality of slots each sized to receive a corresponding one of a plurality of protrusions extending outwardly from an exterior surface of the outer shaft.

12. The transmission system of claim 11, wherein the disconnect mechanism further comprises a bearing that surrounds the outer shaft at an inner diameter of the bearing.

13. The transmission system of claim 12, wherein the disconnect mechanism further comprises a locknut that surrounds the outer shaft and constrains the bearing against translation along the longitudinal axis relative to the outer shaft.

14. The transmission system of claim 13, wherein the disconnect mechanism further comprises a coupling shaft coupled to the bearing at an outer diameter of the bearing.

15. The transmission system of claim 14, wherein the disconnect mechanism further comprises a plurality of snap rings that secure the coupling shaft to the bearing at the outer diameter of the bearing.

16. The transmission system of claim 15, wherein movement of the plurality of protrusions in the plurality of slots causes translation of the bearing, the locknut, the coupling shaft, and the plurality of snap rings along the longitudinal axis with the outer shaft.

17. A method of assembling a disconnect mechanism including a biasing element, an outer shaft, an inner shaft, a coupling shaft, a housing, and a lever, the method comprising:
inserting the biasing element into the outer shaft;
advancing the inner shaft into the outer shaft;
coupling the outer shaft to the coupling shaft such that the outer shaft and the coupling shaft are concentrically aligned along a longitudinal axis;
installing the inner shaft, the outer shaft, and the biasing element in the housing; and
attaching the lever to the inner shaft.

18. The method of claim 17, wherein installing the inner shaft, the outer shaft, and the biasing element in the housing comprises arranging a plurality of protrusions of the outer shaft in a plurality of slots formed in the housing.

19. The method of claim 18, wherein installing the inner shaft, the outer shaft, and the biasing element in the housing comprises aligning the inner shaft, the outer shaft, and the biasing element along the longitudinal axis.

* * * * *